United States Patent
Lin et al.

(10) Patent No.: US 12,079,617 B2
(45) Date of Patent: Sep. 3, 2024

(54) DEVELOPMENT SYSTEM WITH AUTOMATIC UPGRADE FUNCTION AND AUTOMATIC UPGRADE METHOD OF DEVELOPMENT SYSTEM

(71) Applicants: Digiwin Software Co., Ltd, Shanghai (CN); DATA SYSTEMS CONSULTING CO., LTD., New Taipei (TW)

(72) Inventors: Tsai-Yen Lin, Shanghai (CN); Guoxin Sun, Shanghai (CN)

(73) Assignees: Digiwin Software Co., Ltd, Shanghai (CN); DATA SYSTEMS CONSULTING CO., LTD., New Taipei (TW)

( * ) Notice: Subject to any disclaimer, the term of this patent is extended or adjusted under 35 U.S.C. 154(b) by 227 days.

(21) Appl. No.: 17/839,510

(22) Filed: Jun. 14, 2022

(65) Prior Publication Data
US 2023/0333837 A1 Oct. 19, 2023

(30) Foreign Application Priority Data
Apr. 13, 2022 (CN) .......................... 202210382594.1

(51) Int. Cl.
G06F 8/65 (2018.01)
(52) U.S. Cl.
CPC ...................... *G06F 8/65* (2013.01)
(58) Field of Classification Search
CPC ...................................................... G06F 8/65
See application file for complete search history.

(56) References Cited

U.S. PATENT DOCUMENTS

| | | | | |
|---|---|---|---|---|
| 9,063,818 B1* | 6/2015 | Risbood | ................. | G06N 20/00 |
| 10,728,106 B1* | 7/2020 | Hartley | ............... | H04L 41/0896 |
| 2006/0037001 A1* | 2/2006 | Irie | ........................... | G06F 8/36 |
| | | | | 717/101 |
| 2009/0300596 A1* | 12/2009 | Tyhurst | ..................... | G06F 8/65 |
| | | | | 717/173 |
| 2010/0083243 A1* | 4/2010 | Mincarelli | ................ | G06F 8/61 |
| | | | | 717/173 |
| 2011/0314463 A1* | 12/2011 | Charters | ................... | G06F 8/65 |
| | | | | 717/170 |
| 2012/0079471 A1* | 3/2012 | Vidal | ........................ | G06F 8/65 |
| | | | | 717/169 |

(Continued)

*Primary Examiner* — Douglas M Slachta
(74) *Attorney, Agent, or Firm* — JCIPRNET

(57) ABSTRACT

A development system with automatic upgrade function and an automatic upgrade method of a development system are provided. The development system includes a memory apparatus and a processor. The memory apparatus stores multiple application modules, an application software upgrade method package, and multiple software packages corresponding to the application modules. The processor is coupled to the memory apparatus and executes the application software upgrade method package to execute an upgrade development system program, where the processor analyzes versions of the software packages, maintains a software package list according to an analysis result, reads a software repository according to the software package list to obtain a software package in a new version, and installs the software package in the new version to upgrade at least one of the application modules.

12 Claims, 9 Drawing Sheets

(56) References Cited

U.S. PATENT DOCUMENTS

| | | | |
|---|---|---|---|
| 2013/0067449 A1* | 3/2013 | Sannidhanam | G06F 8/60 |
| | | | 717/170 |
| 2013/0104118 A1* | 4/2013 | Somani | G06F 21/6218 |
| | | | 717/173 |
| 2014/0298453 A1* | 10/2014 | Heng | G06F 21/552 |
| | | | 726/22 |
| 2016/0132678 A1* | 5/2016 | Bell, Jr. | G06F 21/14 |
| | | | 726/1 |
| 2019/0065706 A1* | 2/2019 | Nishikawa | G06F 21/608 |
| 2019/0163461 A1* | 5/2019 | Jayaraman | G06F 8/65 |
| 2022/0210288 A1* | 6/2022 | Tsuji | G06F 9/485 |
| 2022/0318396 A1* | 10/2022 | Deng | G06F 21/577 |
| 2022/0334819 A1* | 10/2022 | R | G06F 8/61 |

* cited by examiner

DEVELOPMENT SYSTEM WITH AUTOMATIC UPGRADE FUNCTION AND AUTOMATIC UPGRADE METHOD OF DEVELOPMENT SYSTEM

CROSS-REFERENCE TO RELATED APPLICATION

This application claims the priority benefit of China application serial no. 202210382594.1, filed on Apr. 13, 2022. The entirety of the above-mentioned patent application is hereby incorporated by reference herein and made a part of this specification.

BACKGROUND

Technical Field

The disclosure relates to a software system technology, and more particularly to a development system with automatic upgrade function and an automatic upgrade method of a development system.

Description of Related Art

Currently, tools for upgrading a development system usually only upgrade software packages in a software package list. A developer needs to manually change the software package list when the development system no longer supports and needs to delete a software package, or when a new demand solution needs to add a necessary software package. Even if the software package is successfully upgraded and installed, the developer still needs to revise other configuration files related to the software package or even the configuration files of third-party software packages and the platform architecture. In this case, the developer has to first learn the new syntax and/or how to use the new software package to find out which source code of the development system needs to be manually corrected one by one, which requires a huge amount of learning for the developer and makes it difficult to avoid manual operation errors. The developer has to be familiar with the dependency between third-party software packages, the dependency between application software packages, and/or the dependency between application software packages and third-party software packages to be able to maintain the software package list. In addition, an automatic upgrade solution of a current common development system has to be performed on a cloud server or be connected with a cloud server at a local client end before the server gives notifications or controls the upgrade method, which cannot be flexibly applied to application modules in different demand scenarios.

SUMMARY

The disclosure is directed to a development system with automatic upgrade function and an automatic upgrade method of a development system, which may automatically and efficiently upgrade the development system.

According to the embodiments of the disclosure, the development system with automatic upgrade function of the disclosure includes a memory apparatus and a processor. The memory apparatus stores multiple application modules, an application software upgrade method package, and multiple software packages corresponding to the application modules. The processor is coupled to the memory apparatus and executes the application software upgrade method package to execute an upgrade development system program, where the processor analyzes versions of the software packages, maintains a software package list according to an analysis result, reads a software repository according to the software package list to obtain a software package in a new version, and installs the software package in the new version to upgrade at least one of the application modules.

According to the embodiments of the disclosure, the automatic upgrade method of the development system of the disclosure includes the following steps. An application software upgrade method package is executed to execute an upgrade development system program. Versions of multiple software packages are analyzed, and a software package list is maintained according to an analysis result. A software repository is read according to the software package list to obtain a software package in a new version. The software package in the new version is installed to upgrade at least one of multiple application modules.

Based on the above, the development system with automatic upgrade function and the automatic upgrade method of the development system of the disclosure may automatically upgrade the development system by using the application software upgrade method package and the software package list.

In order to make the aforementioned features and advantages of the disclosure comprehensible, embodiments accompanied with drawings are described in detail below.

DESCRIPTION OF THE EMBODIMENTS

Figure 1:
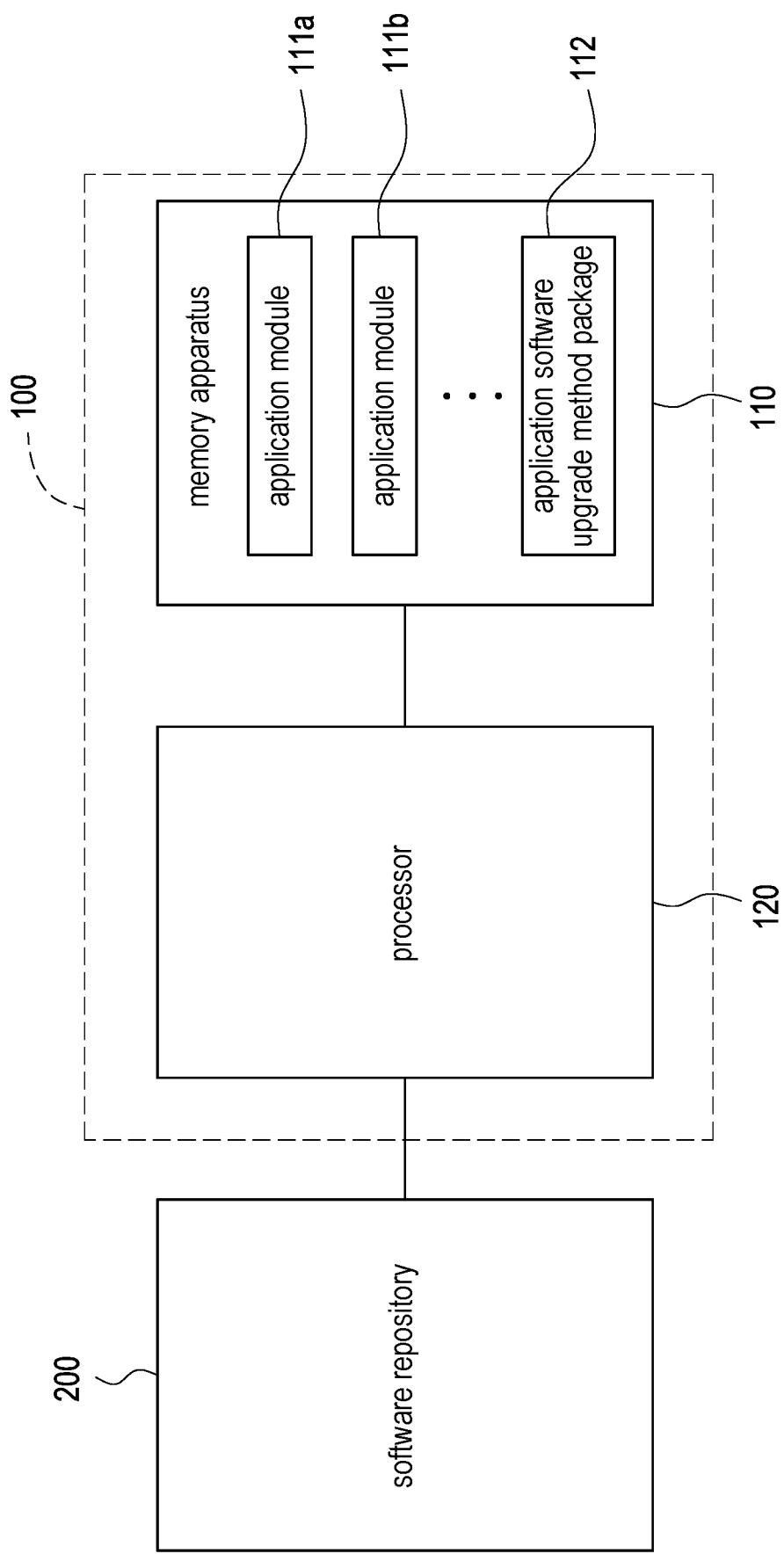
FIG. 1 is a schematic diagram of a development system with automatic upgrade function according to an embodiment of the disclosure.

Reference will now be made in detail to the exemplary embodiments of the disclosure, and examples of the exemplary embodiments are illustrated in the accompanying drawings. Whenever possible, the same reference numerals are used in the drawings and the description to indicate the same or similar parts.

FIG. 1 is a schematic diagram of a development system 100 with automatic upgrade function according to an embodiment of the disclosure. With reference to FIG. 1, the development system 100 includes a memory apparatus 110 and a processor 120. The processor 120 is coupled to the memory apparatus 110. In this embodiment, the development system 100 is, for example but not limited to, a web development system. In this embodiment, the memory apparatus 110 stores multiple application modules (an application module 111a and an application module 111b), an application software upgrade method package 112, and multiple software packages corresponding to the application modules. It should be noted that the number of the application modules shown in FIG. 1 is only for illustration, and the disclosure is not limited thereto. In this embodiment, the software packages may include multiple application software packages and multiple third-party software packages, and a software repository 200 may include, for example, an application software package repository and a third-party software package repository. In this embodiment, the memory apparatus 110 may store a software package list. The software package list is configured to record the dependency between the application modules and the software packages as well as the version information of the software packages.

For example, a developer may extract the application software packages by using the modules, functions and/or core features shared by the development system 100 and other development systems. The developer may select application software packages and/or third-party software packages flexibly as required. Moreover, when installing the software packages, the development system 100 may automatically install the software packages according to the software package list. According to this structure, the development system 100 superimposes and develops exclusive application modules, which exist in a form of source codes. When the development system 100 executes an upgrade development system program, the software packages may be upgraded through installation, and the source codes affected by the software packages need to be revised in the application modules.

In this embodiment, the processor 120 may include a central processing unit (CPU) or other programmable general-purpose or special-purpose microprocessors, a digital signal processor (DSP), an application specific integrated circuit (ASIC), a programmable logic device (PLD), other similar processing circuits, or a combination of these apparatuses. The memory apparatus 110 may include a memory and/or a database. The memory may be, for example, a non-volatile memory (NVM). The memory apparatus 110 may store related programs, modules, systems, or algorithms for implementing the embodiments of the disclosure, for the processor 120 to access and execute the related functions and operations described in the embodiments of the disclosure.

Figure 2:
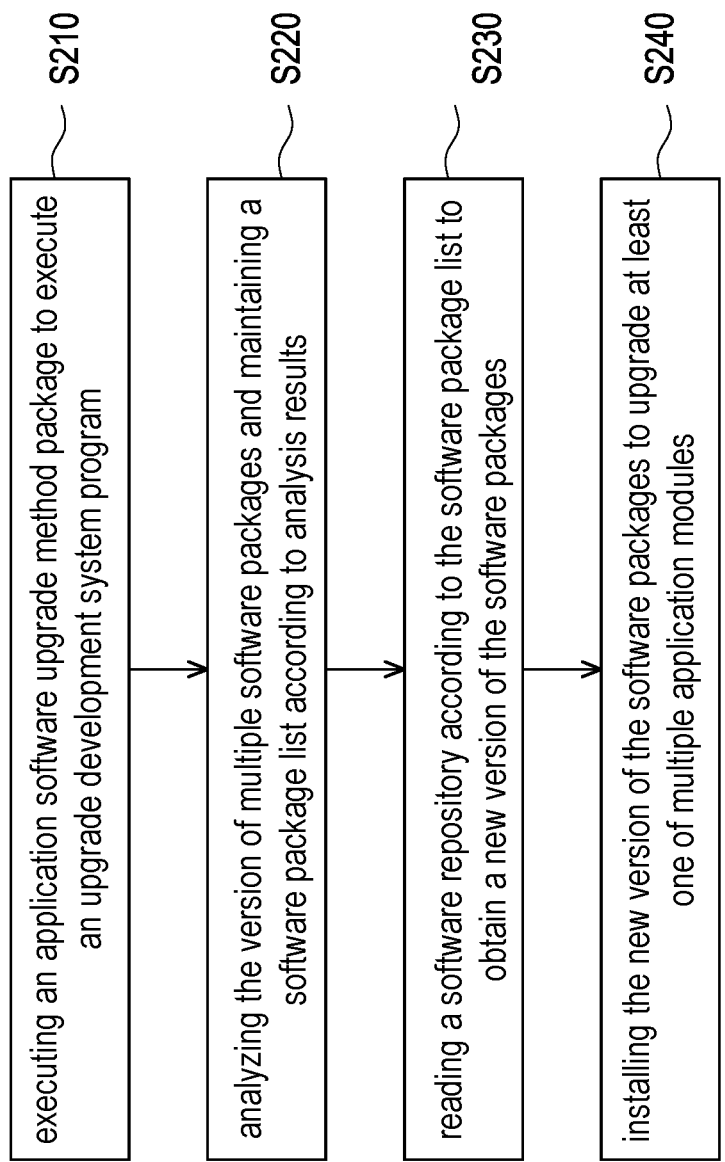
FIG. 2 is a flow chart of an automatic upgrade method of a development system according to an embodiment of the disclosure.

FIG. 2 is a flow chart of an automatic upgrade method of a development system according to an embodiment of the disclosure. With reference to FIG. 1 and FIG. 2, the development system 100 of FIG. 1 may execute the following steps S210 to S240. In step S210, the processor 120 may execute the application software upgrade method package 112 to execute the upgrade development system program. In this embodiment, the methods, rules, logics, process control, and/or scripts in the upgrade development system program of the development system 100 may be included in the application software upgrade method package 112, which is also one of the application software packages. When the development system 100 executes the scripts of the application software upgrade method package 112, the upgrade development system program may be automatically executed. In step S220, the processor 120 may analyze the versions of multiple software packages and maintain a software package list according to an analysis result. In detail, the processor 120 may analyze the versions of application software packages and third-party software packages, and may maintain the software package list according to the analysis result.

In step S230, the processor 120 may read the software repository 200 according to the software package list to obtain a software package in a new version. Specifically, the processor 120 may read the application software package repository and the third-party software package repository according to the software package list to obtain a software package in a new version. In step S240, the processor 120 may install the software package in the new version to upgrade at least one of the application modules (the application module 111a and the application module 111b). Before executing the automatic upgrade method of the development system shown in FIG. 2, the processor 120 may execute the self-update program of the application software upgrade method package 112. Specifically, the processor 120 may receive an upgrade target version parameter and may execute the self-update program of the application software upgrade method package 112 according to the upgrade target version parameter, which will be further explained below.

Figure 3:
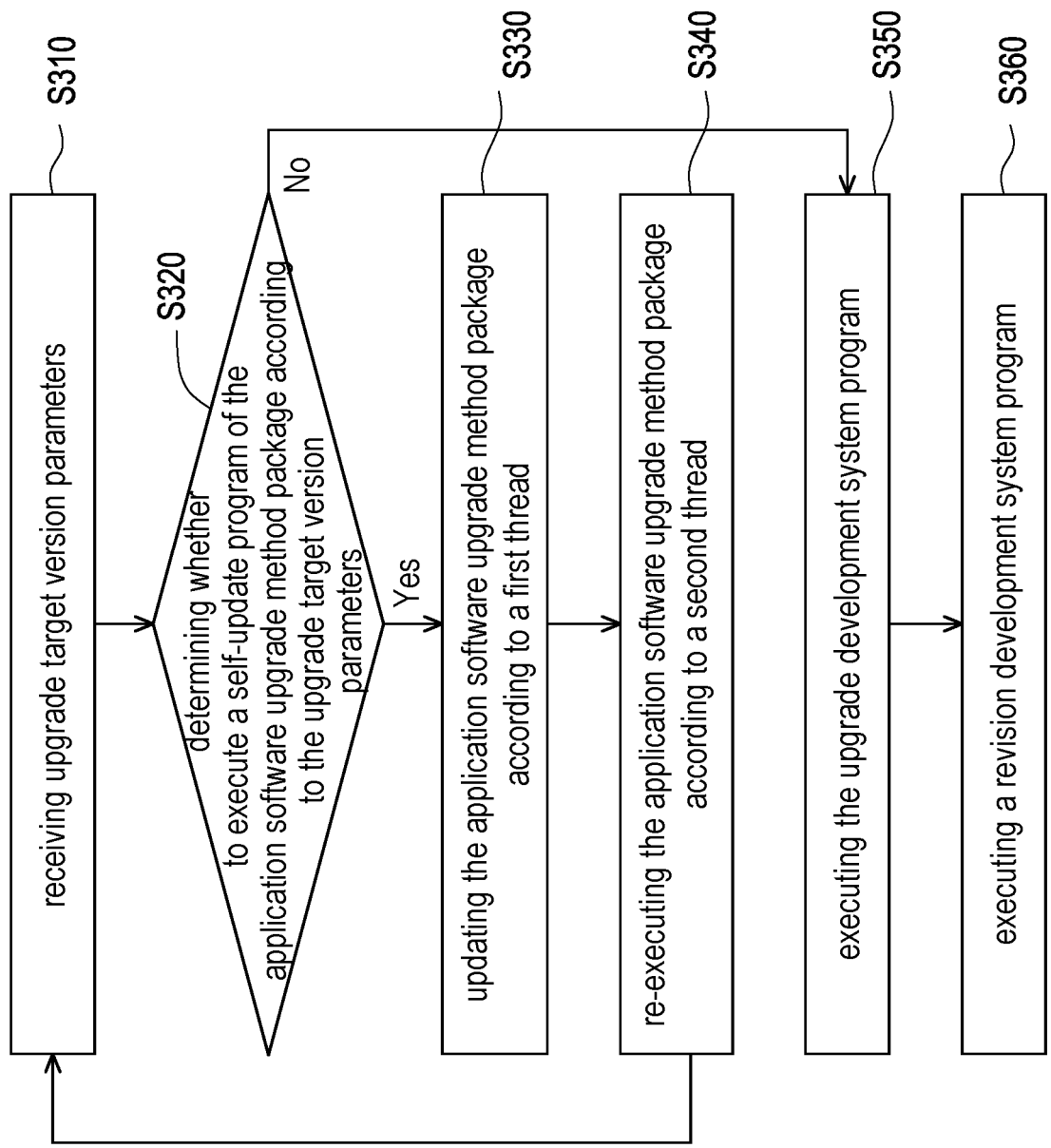
FIG. 3 is a flow chart of a self-update program of an application software upgrade method package according to an embodiment of the disclosure.

FIG. 3 is a flow chart of a self-update program of the application software upgrade method package 112 according to an embodiment of the disclosure. With reference to FIG. 1 and FIG. 3, the development system 100 of FIG. 1 may execute the following steps S310 to S350, and the following steps S310 to S350 may be performed in the step S210 of the foregoing embodiment of FIG. 2. In step S310, the processor 120 may receive an upgrade target version parameter (which is, for example, input by a user). In step S320, the processor 120 may determine whether to execute the self-update program of the application software upgrade method package 112 according to the upgrade target version parameter.

If the processor 120 determines that there is no need to execute the self-update program of the application software upgrade method package 112 (the determination result of step S320 is "No"), then the processor 120 may execute the upgrade development system program in step S350. The upgrade development system program will be further explained in the following embodiments. In step S360, the processor 120 may execute a revision development system program. The revision development system program will be further explained in the following embodiments.

If the processor 120 determines that there is a need to execute the self-update program of the application software upgrade method package 112 (the determination result of step S320 is "Yes"), then the processor 120 may establish a first thread and a second thread. Next, in step S330, the processor 120 may update the application software upgrade method package 112 according to the first thread. The processor 120 may execute an install command (a command for installing the application software upgrade method package 112) according to the first thread to download the application software upgrade method package 112 in a new version from the application software package repository, and may install the application software upgrade method package 112 in the new version. The new version is a version indicated in the upgrade target version parameter. Next, in step S340, the processor 120 may re-execute the application software upgrade method package 112 according to the second thread. In other words, the processor 120 may re-execute an automation script of the application software upgrade method package 112 in the new version according to the second thread and automatically transfer the original upgrade target version parameter to the automation script.

After step S340, the processor 120 performs step S310 again. In addition, the upgrade development system program in step S350 of FIG. 3 will be further explained below.

Figure 4:
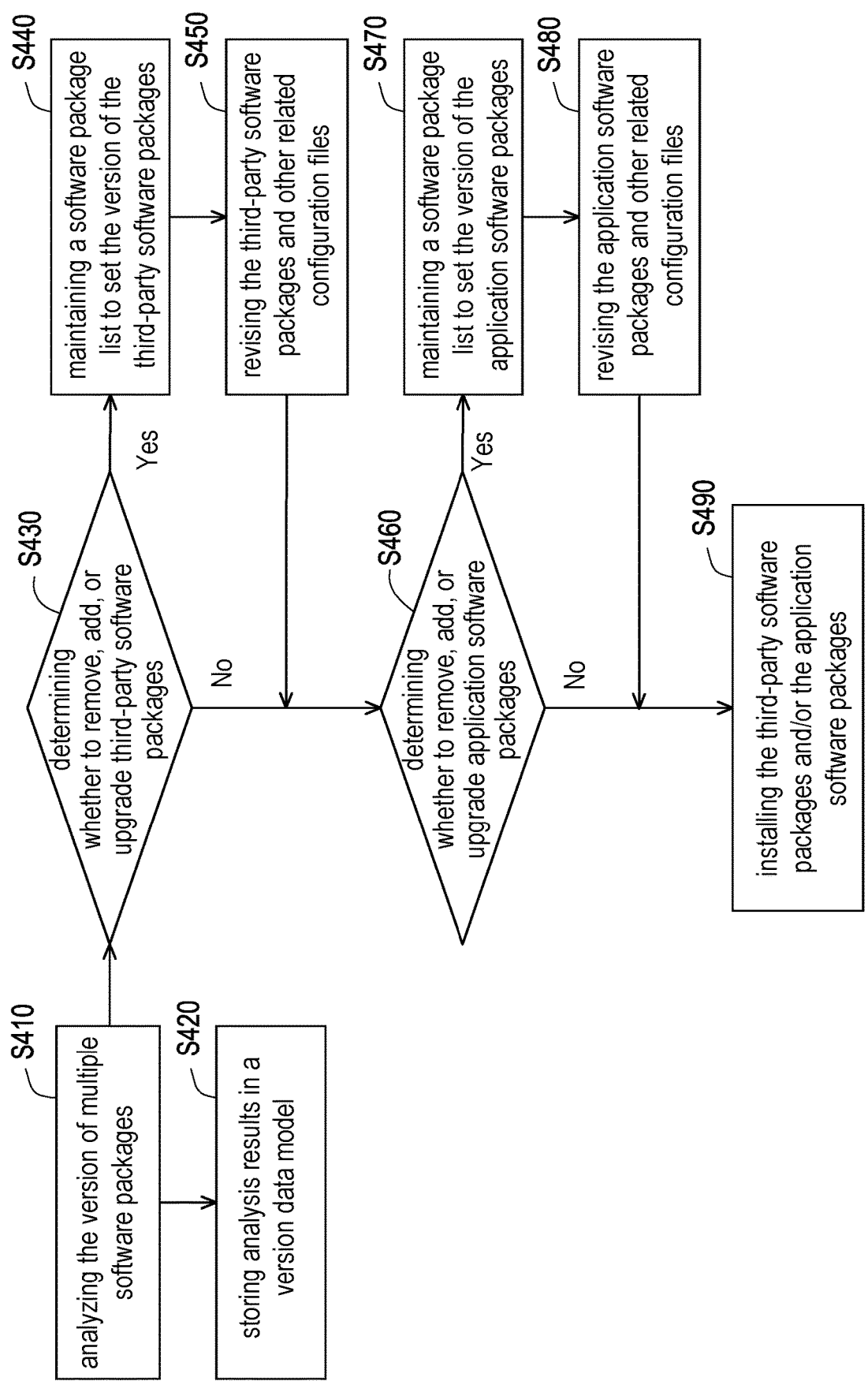
FIG. 4 is a flow chart of an upgrade development system program according to an embodiment of the disclosure.

FIG. 4 is a flow chart of an upgrade development system program according to an embodiment of the disclosure. With reference to FIG. 1 and FIG. 4, the development system 100 of FIG. 1 may execute the following steps S410 to S490, and FIG. 4 further explains step S350 of FIG. 3. In this embodiment, the processor 120 may determine whether to adjust version information of the application software packages and the third-party software packages to maintain the software package list and revise the corresponding configuration files. In step S410, the processor 120 may analyze the versions of the software packages. The processor 120 searches for the version information of the installed application software packages in an installation directory of the software package to obtain upgrade initial version information (which indicates from which version the upgrade is performed in the upgrade development system program). Next, the processor 120 may receive a parameter from outside the development system 100 and convert its version format into the version format of the application software package to obtain the upgrade target version information (which indicates to which version the upgrade is performed in the upgrade development system program). In step S420, the processor 120 may store the analysis result in a version data model (stored by the memory apparatus 110).

In step S430, the processor 120 may determine whether to delete, add, or upgrade the third-party software packages. Specifically, the processor 120 may analyze the software package list and determine whether to delete, add, and/or upgrade the version of the depended third-party software package. If the processor 120 determines that there is a need to delete, add, or upgrade the third-party software packages (the determination result in step S430 is "Yes"), the processor 120 maintains the software package list to set the version of the third-party software packages in step S440. Specifically, the processor 120 may set the names and version numbers of the third-party software packages in the software package list, and the upgraded and added versions are those designated for use by the application modules. In step S450, the processor 120 may revise the third-party software packages and other related configuration files.

If the processor 120 determines that there is no need to delete, add, or upgrade the third-party software packages (the determination result in step S430 is "No"), the processor 120 may determine whether to delete, add, or upgrade the application software packages in step S460. Specifically, the processor 120 may analyze the software package list to determine whether to delete, add, or upgrade the versions of the application software packages.

If the processor 120 determines that there is a need to delete, add, or upgrade the application software packages (the determination result of step S460 is "Yes"), the processor 120 maintains the software package list to set the versions of the application software packages in step S470. Specifically, the processor 120 sets the names and version numbers of the application software packages in the software package list, and the upgraded and added versions are equivalent to those designated for use by the upgrade target version information or the application modules.

In step S480, the processor 120 may revise the application software packages and other related configuration files. If the processor 120 determines that there is no need to delete, add, or upgrade the application software packages (the determination result of step S460 is "No"), the processor 120 may install the third-party software packages and/or the application software packages in step S490. In detail, the processor 120 may download and install the software packages from the application software package repository and the third-party software package repository according to the software package list.

Figure 5A:
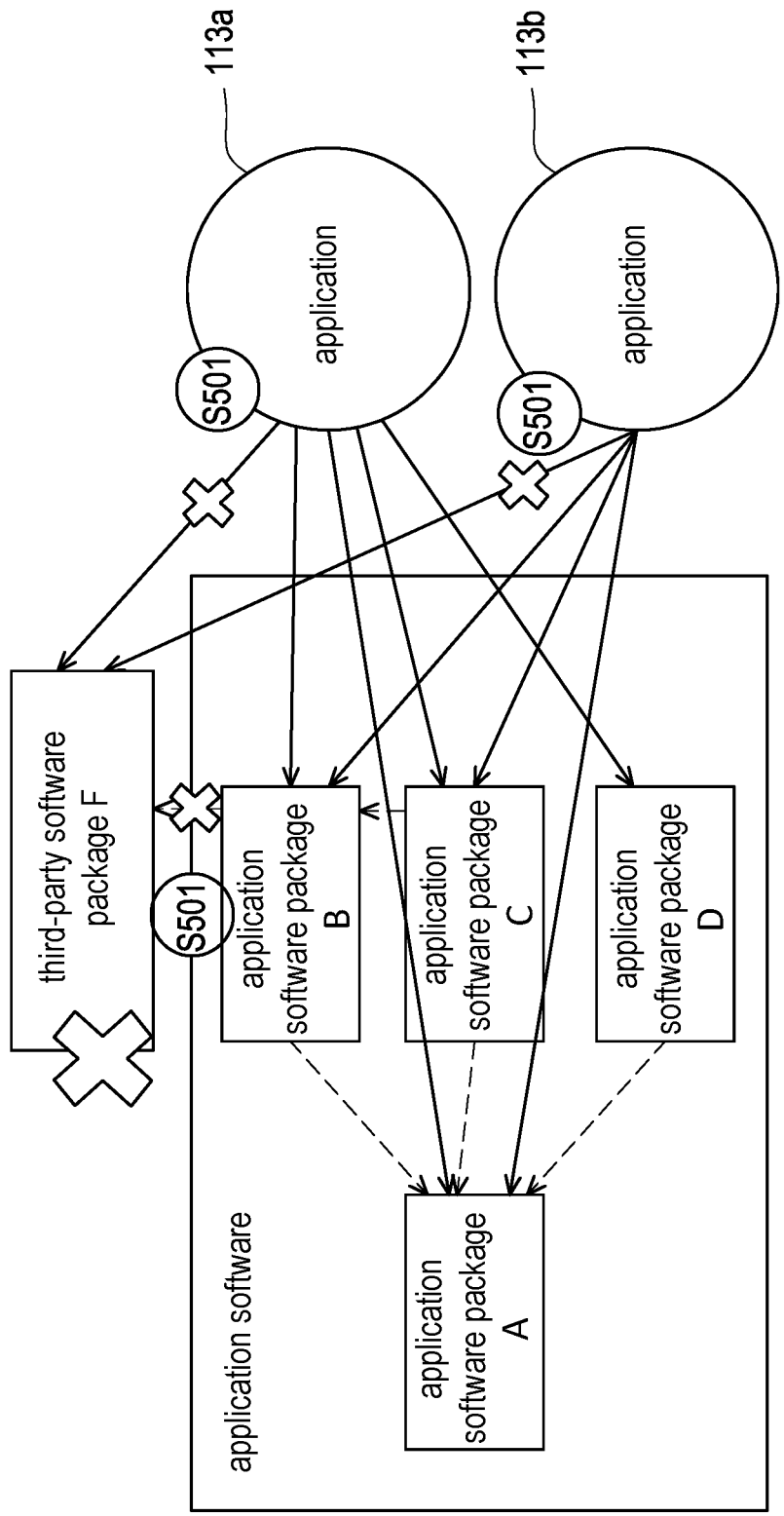
FIG. 5A and FIG. 5B are schematic diagrams of an upgrade development system program according to an embodiment of the disclosure.
Figure 5B:
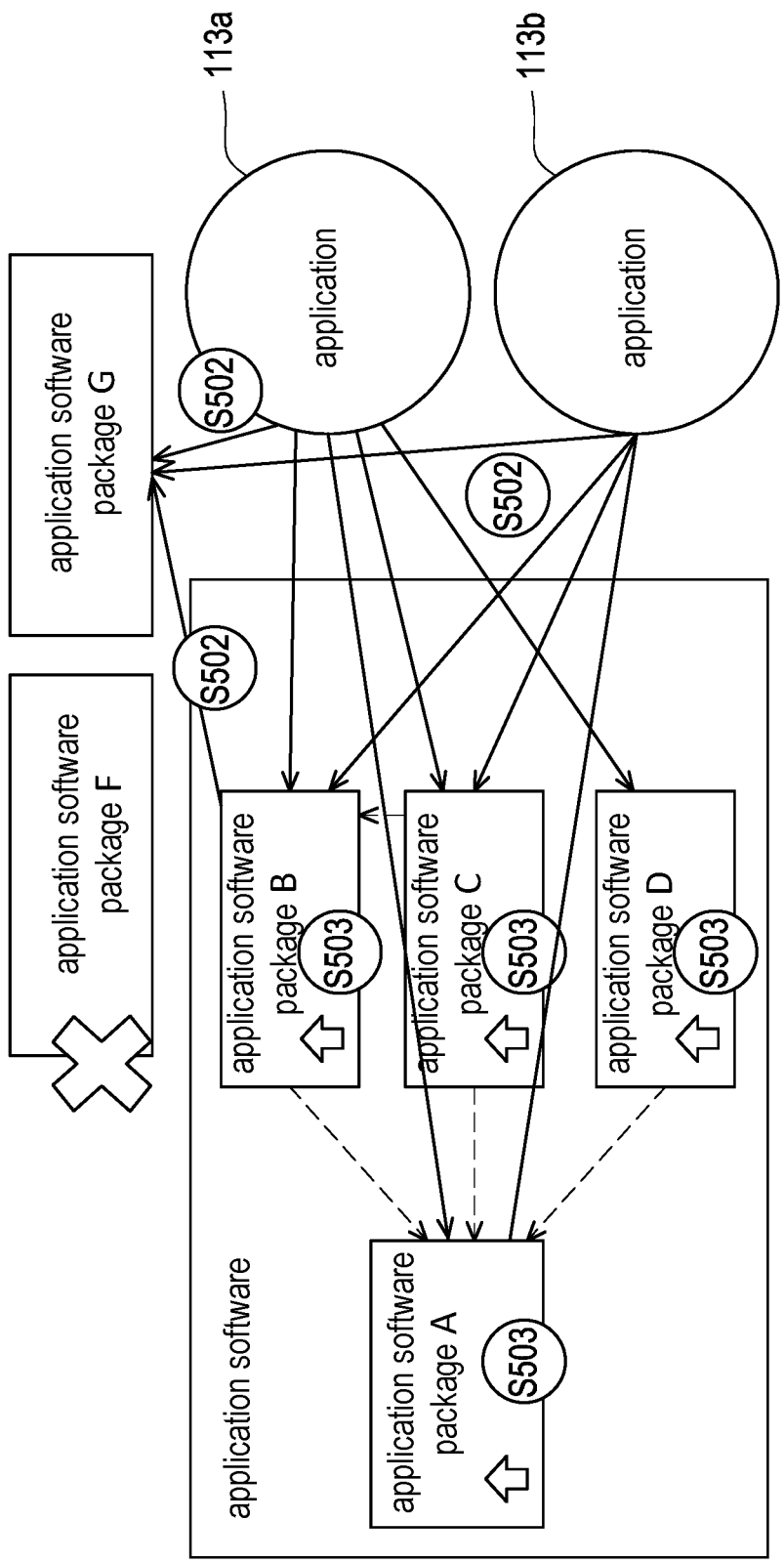

FIG. 5A and FIG. 5B are schematic diagrams of an upgrade development system program according to an embodiment of the disclosure. For example, as shown in FIG. 5A, the memory apparatus 110 may further store an application 113a and an application 113b. The application 113a and/or the application 113b is, for example, a web application. In detail, the application 113a may have the application module 111a and/or the application module 111b, and the application 113b may have the application module 111a and/or the application module 111b. The software package list of the application 113a records the dependency between the application 113a and an application software package A, an application software package B, an application software package C, an application software package D, and a third-party software package F. On the other hand, the software package list of the application 113b records the dependency between the application 113b and the application software package A, the application software package B, the application software package C, and the third-party software package F.

With reference to FIG. 1, FIG. 5A, and FIG. 5B together, when the third-party software package F is discarded or the development system 100 no longer supports the third-party software package F, the step of the processor 120 maintaining the software package list of the application 113a and the software package list of the application 113b may include the following steps S501 to S503. In step S501, the processor 120 may delete the dependency of the third-party software package F from the software package list of the application 113a and delete the dependency of the third-party software package F from the software package list of the application 113b. In step S502, the processor 120 may add the dependency of a third-party software package G to the software package list of the application 113a and add the dependency of the third-party software package G to the software package list of the application 113b. In step S503, the processor 120 may upgrade the versions of the application software package A, the application software package B, the application software package C, and the application software package D in the software package list of the application 113a and upgrade the versions of the application software package A, the application software package B, and the application software package C in the software package list of the application 113b.

After completion of the upgrade development system program, the processor 120 may execute the revision development system program. The methods, rules, logics, process control, and/or scripts in the revision development system program of the development system 100 are all included in the application software upgrade method package 112, which is also one of the application software packages. The processor 120 executes the scripts to automatically execute the revision development system program. In detail, according to the version information of each application software package, upgrade rules exclusive to the version information may be designed, and special processing logics for upgrade may be customized, For example, changes in program syntax, service and component usage syntax, configuration files of third-party software packages and application software packages caused by destructive updates are automatically corrected. Information of one single version may have zero to multiple upgrade rules. If the information includes multiple versions, the upgrade rules may be executed in the order of serial numbers.

Figure 6:
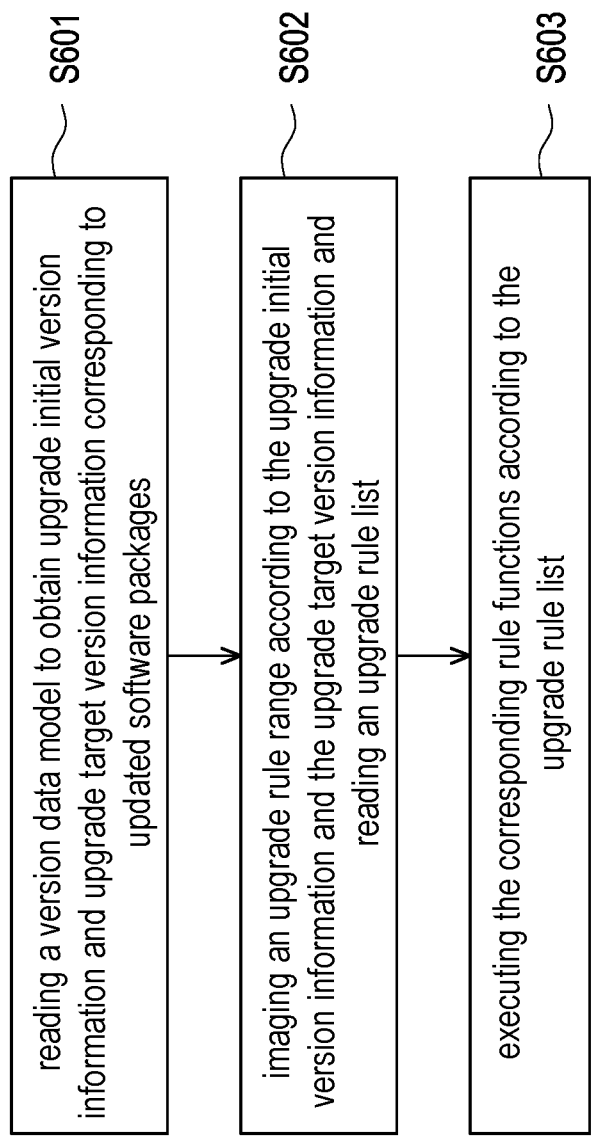
FIG. 6 is a flow chart of a revision development system program according to an embodiment of the disclosure.

FIG. 6 is a flow chart of a revision development system program according to an embodiment of the disclosure. With reference to FIG. 1 and FIG. 6, the development system 100 of FIG. 1 may execute the following steps S601 to S603, and FIG. 6 further explains step S360 of FIG. 3. In step S601, the processor 120 may read the version data model to obtain the upgrade initial version information and the upgrade target version information corresponding to the software packages in the updated versions. In step S602, the processor 120 may image the upgrade rule range according to the upgrade initial version information and the upgrade target version information and read the upgrade rule list from the memory apparatus 110. The upgrade rule list may record the version numbers of the upgrade rules and the corresponding rule functions. In step S603, the processor 120 may execute the corresponding rule functions according to the upgrade rule list.

Figure 7:
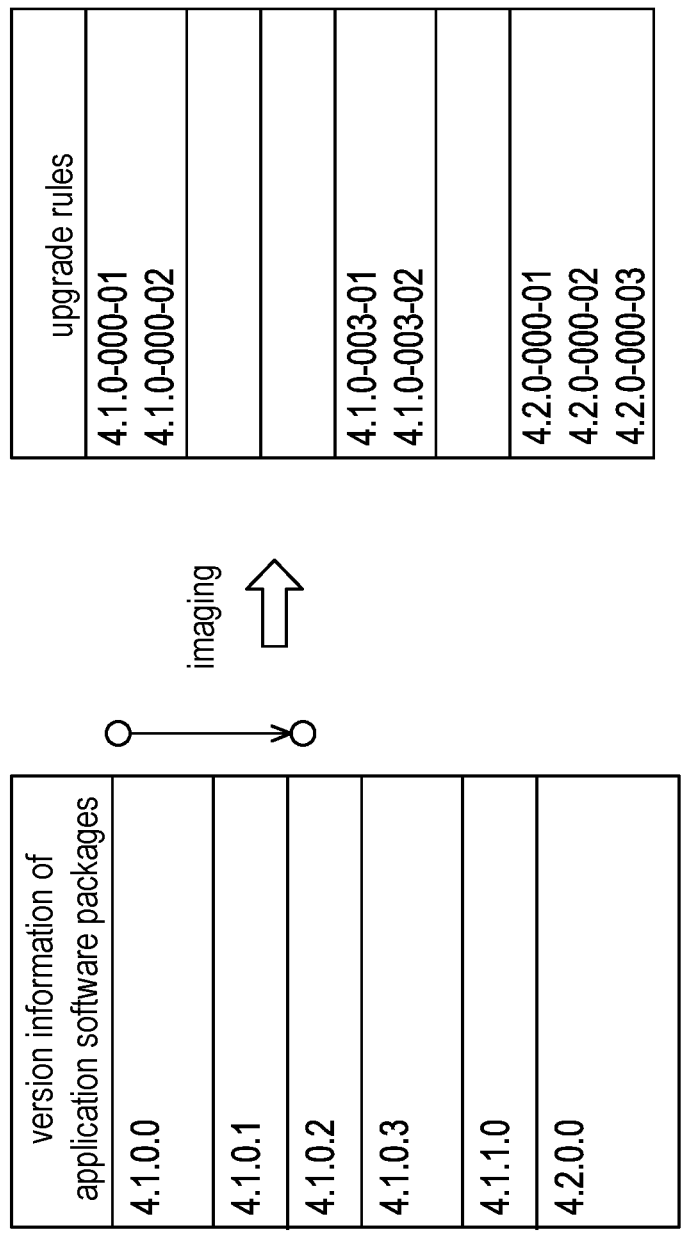
FIG. 7 is a schematic diagram of a revision development system program according to an embodiment of the disclosure.

FIG. 7 is a schematic diagram of a revision development system program according to an embodiment of the disclosure. With reference to FIG. 1, FIG. 6, and FIG. 7 together, for example, as shown in FIG. 7, the upgrade initial version information obtained by the processor 120 is in version 4.1.0.0, and the upgrade target version information obtained by the processor 120 is in version 4.1.0.2 (which means upgrading from version 4.1.0.0 to version 4.1.0.2). The processor 120 may image the upgrade rule range according to the upgrade initial version information and the upgrade target version information and read the upgrade rule list. Since there is no upgrade rule in the upgrade rule range imaged according to the upgrade initial version information (version 4.1.0.0) and the upgrade target version information (version 4.1.0.2), the development system 100 is upgraded to version 4.1.0.2 without a need to execute any upgrade rule (and the corresponding rule functions) by the processor 120.

Figure 8:
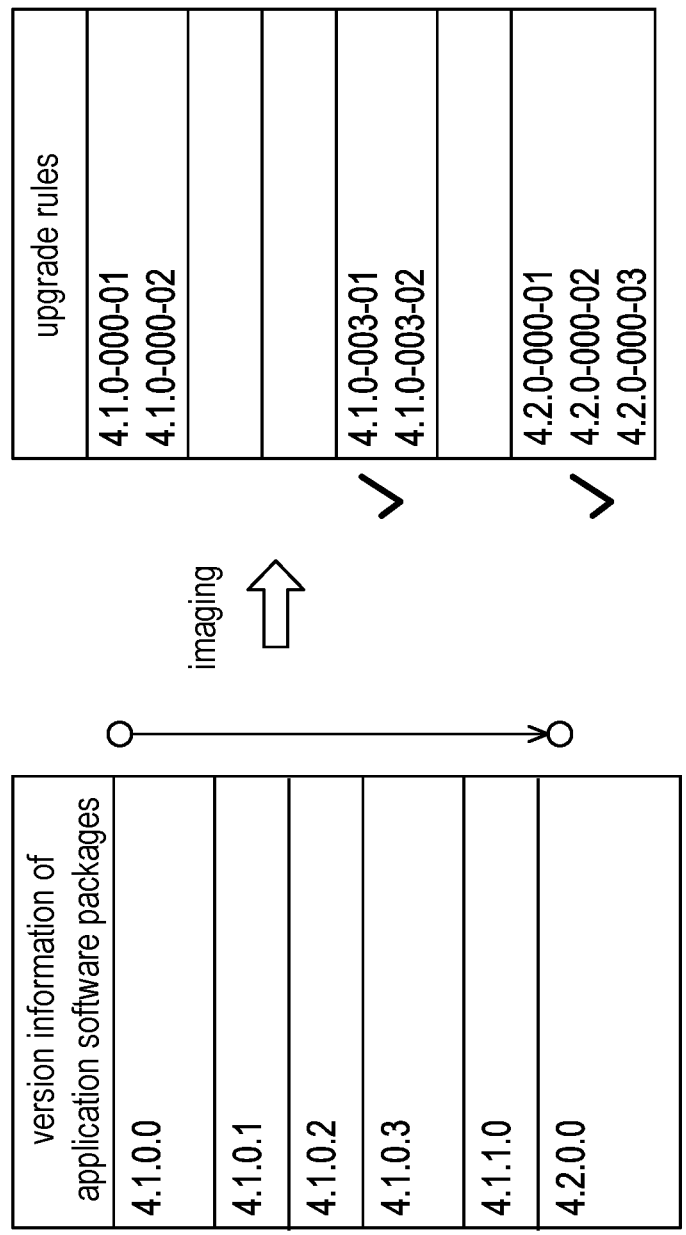
FIG. 8 is a schematic diagram of a revision development system program according to another embodiment of the disclosure.

FIG. 8 is a schematic diagram of a revision development system program according to another embodiment of the disclosure. With reference to FIG. 1, FIG. 6, and FIG. 8 together, for another example, as shown in FIG. 8, the upgrade initial version information obtained by the processor 120 is version 4.1.0.0, and the upgrade target version information obtained by the processor 120 is version 4.2.0.0 (which means upgrading from version 4.1.0.0 to version 4.2.0.0). The processor 120 may image the upgrade rule range according to the upgrade initial version information and the upgrade target version information and read the upgrade rule list. Since there are upgrade rules in the upgrade rule range imaged according to the upgrade initial version information (version 4.1.0.0) and the upgrade target version information (version 4.2.0.0), the development system 100 is upgraded to version 4.2.0.0, and the processor 120 executes the rule function corresponding to an upgrade rule 4.1.0-003-01, the rule function corresponding to an upgrade rule 4.1.0-003-02, the rule function corresponding to an upgrade rule 4.2.0-000-01, the rule function corresponding to an upgrade rule 4.2.0-000-02, and the rule function corresponding to an upgrade rule 4.2.0-000-03.

In summary, the development system with automatic upgrade function and the automatic upgrade method of the development system of the disclosure allow a developer to save the high learning costs of learning and upgrading the development system and avoid operation errors of manual gradual upgrades through automation. The application software upgrade method package may execute the self-update program, and after self-update, the application software upgrade method package automatically executes the upgrade development system program and the revision development system program with the logics in the new version. In addition, the upgrade development system program may further automatically determine whether to adjust the version information of the application software packages and the third-party software packages to maintain the software package list and revise the corresponding configuration files, thereby realizing automatic and efficient upgrades of the development system.

Finally, it should be noted that the above embodiments are only used to illustrate the technical solutions of the disclosure and are not intended to limit it. Although the disclosure has been described in detail with reference to the above embodiments, persons of ordinary skill in the art should understand that they may still modify the technical solutions described in the above embodiments, or replace some or all of the technical features therein with equivalents, and that such modifications or replacements of corresponding technical solutions do not substantially deviate from the scope of the technical solutions of the embodiments of the disclosure.

What is claimed is:

1. A development system with automatic upgrade function, comprising:
   a memory apparatus, storing a plurality of application modules, an application software upgrade method package, and a plurality of software packages corresponding to the plurality of application modules; and
   a processor, coupled to the memory apparatus, and executing the application software upgrade method package to execute an upgrade development system program, wherein the upgrade development system program comprises:
   analyzing versions of the plurality of software packages and maintaining a software package list according to an analysis result by the processor; and
   reading a software repository according to the software package list to obtain a software package in a new version and installing the software package in the new version to upgrade at least one of the plurality of application modules by the processor,
   wherein the software package comprises a plurality of application software packages and a plurality of third-party software packages, and the software repository comprises an application software package repository and a third-party software package repository,
   wherein the processor receives an upgrade target version parameter and executes a self-update program of the application software upgrade method package according to the upgrade target version parameter,
   wherein the self-update program comprises:
   establishing a first thread and a second thread, updating the application software upgrade method package according to the first thread, and re-executing the application software upgrade method package according to the second thread by the processor,
   wherein the processor executes an install command according to the first thread to download an application software upgrade method package in a new version from the application software package repository, and installs the application software upgrade method package in the new version.

2. The development system according to claim 1, wherein the processor determines whether to adjust version information of the plurality of application software packages and the plurality of third-party software packages to maintain the software package list and revise corresponding configuration files.

3. The development system according to claim 1, wherein the processor stores the analysis result in a version data model stored by the memory apparatus.

4. The development system according to claim 3, wherein after the processor completes the upgrade development system program, the processor executes a revision development system program, wherein the revision development system program comprises:
    reading the version data model by the processor to obtain upgrade initial version information and upgrade target version information corresponding to a software package in an updated version;
    imaging an upgrade rule range according to the upgrade initial version information and the upgrade target version information and reading an upgrade rule list by the processor; and
    executing a corresponding rule function according to the upgrade rule list by the processor.

5. The development system according to claim 1, wherein the software package list is configured to record a dependency relationship between the plurality of application modules and the plurality of software packages and version information of the plurality of software packages.

6. The development system according to claim 1, wherein the development system is a web development system.

7. An automatic upgrade method for a development system, comprising:
    executing an application software upgrade method package to execute an upgrade development system program;
    analyzing versions of a plurality of software packages and maintaining a software package list according to an analysis result;
    reading a software repository according to the software package list to obtain a software package in a new version; and
    installing the software package in the new version to upgrade at least one of a plurality of application modules,
    wherein the software package comprises a plurality of application software packages and a plurality of third-party software packages, and the software repository comprises an application software package repository and a third-party software package repository,
    wherein the automatic upgrade method further comprising:
        receiving an upgrade target version parameter; and
        executing a self-update program of the application software upgrade method package according to the upgrade target version parameter,
    wherein the self-update program comprises:
        establishing a first thread and a second thread;
        updating the application software upgrade method package according to the first thread; and
        re-executing the application software upgrade method package according to the second thread,
    wherein the step of updating the application software upgrade method package comprises:
        executing an install command according to the first thread to download an application software upgrade method package in a new version from the application software package repository; and
        installing the application software upgrade method package in the new version.

8. The automatic upgrade method according to claim 7, wherein the step of analyzing the versions of the plurality of software packages and maintaining the software package list according to the analysis result comprises:
    determining whether to adjust version information of the plurality of application software packages and the plurality of third-party software packages to maintain the software package list and revise corresponding configuration files.

9. The automatic upgrade method according to claim 7, further comprising:
    storing the analysis result in a version data model stored by the memory apparatus.

10. The automatic upgrade method according to claim 9, further comprising:
    executing a revision development system program after completion of the upgrade development system program, wherein the revision development system program comprises:
    reading the version data model to obtain upgrade initial version information and upgrade target version information corresponding to a software package in an updated version;
    imaging an upgrade rule range according to the upgrade initial version information and the upgrade target version information and reading an upgrade rule list; and
    executing a corresponding rule function according to the upgrade rule list.

11. The automatic upgrade method according to claim 7, wherein the software package list is configured to record a dependency between the plurality of application modules and the plurality of software packages and version information of the plurality of software packages.

12. The automatic upgrade method according to claim 7, wherein the development system is a web development system.

* * * * *